US009126501B2

(12) United States Patent
Ozaki (10) Patent No.: US 9,126,501 B2
(45) Date of Patent: Sep. 8, 2015

(54) ELECTRIC VEHICLE (71) Applicant: NTN CORPORATION, Osaka (JP)

(72) Inventor: Takayoshi Ozaki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/355,735

(22) PCT Filed: Nov. 21, 2012

(86) PCT No.: PCT/JP2012/080230
§ 371 (c)(1),
(2) Date: May 1, 2014

(87) PCT Pub. No.: WO2013/077376
PCT Pub. Date: May 30, 2013

(65) Prior Publication Data
US 2014/0303824 A1    Oct. 9, 2014

(30) Foreign Application Priority Data

Nov. 22, 2011   (JP) ................................. 2011-254570

(51) Int. Cl.
*B60L 15/20*      (2006.01)
*B60L 7/24*       (2006.01)
(Continued)

(52) U.S. Cl.
CPC .............. *B60L 15/2009* (2013.01); *B60L 7/18* (2013.01); *B60L 7/24* (2013.01); *B60L 11/1861* (2013.01);
(Continued)

(58) Field of Classification Search
CPC ... B60W 20/00; B60W 10/18; B60W 10/184; B06T 8/00; B06T 8/175; B06T 8/30

USPC ......... 701/22, 70; 303/152; 180/65.1, 65.265, 180/65.275, 65.285, 65.31; 903/947
See application file for complete search history.

(56) References Cited

U.S. PATENT DOCUMENTS 4,962,969 A  * 10/1990  Davis ................................. 303/3
5,358,317 A  * 10/1994  Cikanek ........................ 303/152
(Continued)

FOREIGN PATENT DOCUMENTS

| JP | 2005-225482 | 8/2005 |
| JP | 2006-34012 | 2/2006 |

(Continued)

OTHER PUBLICATIONS

International Search Report mailed Dec. 25, 2012 in corresponding International Patent Application No. PCT/JP2012/080230.
(Continued)

*Primary Examiner* — Thomas Tarcza
*Assistant Examiner* — Tyler J Lee (57) ABSTRACT

An electric vehicle includes a regenerative brake and a mechanical brake. The vehicle also includes a wheel bearing unit and a load sensor associated with the wheel bearing unit. The load sensor is configured to detect a load that acts between a road surface and a tire along a direction in which the vehicle travels. The vehicle also includes a load-responsive regenerative brake limiter configured to reduce a braking torque generated by the regenerative brake when an output of the load sensor reaches a preset value. A maximally actuator may be configured to calculate a maximum possible regenerative braking torque for the regenerative brake based on a rotational frequency of a wheel and a state of charge of a battery unit and to actuate the regenerative brake at a maximum torque within that commanded range.

7 Claims, 9 Drawing Sheets

A : TIRE ROT FREQ    D : DCC SIG       G : CUR CMD
B : ACC SIG          E : IWM SYS INFO  H : MOTOR CUR
C : CORNERING SIG    F : ACC/DCC CMD   I : ROTOR ANG (51) Int. Cl.
  *B60T 1/10* (2006.01)
  *B60T 13/58* (2006.01)
  *B60L 7/18* (2006.01)
  *B60L 11/18* (2006.01)
  *B60T 13/74* (2006.01)
  *F16D 61/00* (2006.01)

(52) U.S. Cl.
  CPC ................ *B60T 1/10* (2013.01); *B60T 13/586* (2013.01); *B60T 13/741* (2013.01); *F16D 61/00* (2013.01); *B60L 2240/461* (2013.01); *B60L 2240/465* (2013.01); *B60T 2240/06* (2013.01); *B60T 2270/604* (2013.01); *Y02T 10/7005* (2013.01); *Y02T 10/705* (2013.01); *Y02T 10/7044* (2013.01); *Y02T 10/7258* (2013.01)

(56) References Cited

U.S. PATENT DOCUMENTS

| | | | |
|---|---|---|---|
| 5,365,431 A * | 11/1994 | Minezawa et al. | 701/22 |
| 5,450,324 A * | 9/1995 | Cikanek | 701/108 |
| 5,472,265 A * | 12/1995 | Ohnuma | 303/3 |
| 5,615,933 A * | 4/1997 | Kidston et al. | 303/152 |
| 6,086,166 A * | 7/2000 | Fukasawa | 303/152 |
| 6,231,134 B1 * | 5/2001 | Fukasawa et al. | 303/152 |
| 6,325,470 B1 * | 12/2001 | Schneider | 303/152 |
| 6,709,075 B1 * | 3/2004 | Crombez et al. | 303/152 |
| 7,077,484 B2 * | 7/2006 | Sasaki et al. | 303/152 |
| 7,281,770 B1 * | 10/2007 | Curran et al. | 303/151 |
| 7,409,280 B2 | 8/2008 | Nakamura et al. | |
| 7,937,194 B2 * | 5/2011 | Nasr et al. | 701/22 |
| 8,506,438 B2 | 8/2013 | Makino | |
| 2005/0159871 A1 | 7/2005 | Nakamura et al. | |
| 2007/0038340 A1 | 2/2007 | Sekiguchi et al. | |
| 2010/0217491 A1 | 8/2010 | Naito et al. | |
| 2011/0082000 A1 | 4/2011 | Makino | |

FOREIGN PATENT DOCUMENTS

| | | |
|---|---|---|
| JP | 2007-49825 | 2/2007 |
| JP | 2009-12541 | 1/2009 |
| JP | 2009-278840 | 11/2009 |
| JP | 2010-32038 | 2/2010 |

OTHER PUBLICATIONS

PCT International Preliminary Report on Patentability mailed Jun. 5, 2014 in corresponding International Patent Application No. PCT/JP2012/080230.

* cited by examiner

ELECTRIC VEHICLE

CROSS REFERENCE TO THE RELATED APPLICATIONS

This application is a U.S. national stage application of PCT/JP2012/080230 filed Nov. 21, 2012 and claims foreign priority benefit of Japanese Patent Application No. 2011-254570 filed Nov. 22, 2011 in the Japanese Intellectual Property Office, the contents of which are incorporated herein by reference.

BACKGROUND OF THE INVENTION

1. Field of the Invention

The present invention relates to an electric vehicle, such as an in-wheel motor vehicle, that is equipped with motor(s) to drive wheels and that may be battery-powered or fuel cell-powered.

2. Description of Related Art

An electric vehicle often employs an IPM motor (e.g., Interior Permanent Magnet synchronous motor) to increase the maximum travel distance that is possible with a limited battery capacity. This kind of motor is characterized by its ability to allow a regenerative braking operation to be performed with ease. Where the maximum travel range is a key issue, it may be desirable to utilize the regenerative brake as much as possible. One example of the art in this technical field is disclosed in the Patent Document 1 listed below.

[Patent Document 1] JP Laid-open Patent Publication No. 2010-032038

SUMMARY OF THE INVENTION

A regenerative brake provides a more direct, braking path to a wheel than that of a friction brake. Thus, compared with friction braking, excessive application of regenerative braking may result in the slip of a tire. Therefore, it is a challenge to effect appropriate application of regenerative braking. In particular, with an in-wheel motor drive system, a braking torque may be transmitted right onto its corresponding wheel, so that allocation of torque among different wheels may not be available. Thus, minimizing possible slip of a tire may be all the more important. It may be contemplated to control, between a mechanical brake and a regenerative brake, how much braking operation should be allocated to a regenerative brake, based on detected values of a drive torque of a motor and/or a rotational speed of a wheel, in order to effect appropriate application of regenerative braking that avoids possible slip. However, a wheel may often lose contact with a road surface during travel. Also, the coefficient of friction between a tire and a road surface may change depending on the condition of the road surface. Thus, appropriate control of a regenerative brake may be difficult based on detected values of a drive torque of a motor and/or a rotational speed of a wheel alone.

An object of the present invention is to provide an electric vehicle which may enable utilizing a regenerative brake as much as possible and may prevent possible slip of a tire caused by excessive regenerative braking with the regenerative brake. General aspects of the present invention will now be described using reference signs in the figures showing embodiments of the present invention.

The present invention provides an electric vehicle that includes a motor unit 6 configured to drive a wheel 2; a motor control circuitry 29 configured to control the motor unit 6, the motor control circuitry 29 including a regenerative brake 34 configured to operate the motor unit 6 as a power generator to apply a regenerative braking force to the wheel 2; a mechanical brake 9 configured to mechanically apply a braking force to the wheel 2; a wheel bearing unit 4 supporting the wheel 2; a load sensor 41 associated with the wheel bearing unit 4, the load sensor 41 being configured to detect a load that acts between a road surface and a tire along a direction in which the vehicle travels; and a load-responsive regenerative brake limiter 36 configured to reduce a braking torque generated by the regenerative brake 34 when an output of the load sensor 41 reaches a preset value.

With such a configuration, the load-responsive regenerative brake limiter 36 may reduce a braking torque generated by the regenerative brake 34 when a load that acts between a road surface and a tire along a direction in which the vehicle travels reaches the preset value. In this way, a braking torque generated by a regenerative brake 34 may be reduced depending on a load that acts between a road surface and a tire, thus preventing possible slip of a tire caused by excessive regenerative braking with the regenerative brake 34. In particular, braking with the regenerative brake 34 may be limited depending on a load that is actually acting from a road surface to a tire and vice versa. Such a configuration may—unlike a configuration in which regenerative braking is limited based on detected values of a drive torque of a motor unit 6 and/or a rotational speed of a wheel—may enable appropriate and prompt control to be carried out, for example, regardless of changes in the condition of a road surface and/or even when a tire loses contact with a road surface. In this way, possible slip of a tire caused by excessive regenerative braking with a regenerative brake 34 may be prevented, while utilizing the regenerative brake 34 as much as possible.

The load-responsive regenerative brake limiter 36 may be configured to, after an output of the load sensor 41 reaches the preset value and the braking torque generated by the regenerative brake 34 is reduced, halt control performed to reduce a braking torque generated by the regenerative brake 34 when an output of the load sensor 41 becomes equal to or less than a recovery preset value that is smaller than the preset value. When a load that acts between a road surface and a tire along a direction in which the vehicle travels decreases, it may no longer be necessary to reduce a braking torque generated by a regenerative brake 34. In this case, halt of such a reduction-inducing control may allow for utilizing the regenerative brake 34 as much as possible, thus enabling the corresponding recovery of energy.

In one embodiment of the present invention, the motor control circuitry 29 may further include a maximally actuator 35 configured to, when the motor control circuitry 29 is fed with a regenerative braking torque command from a brake manipulation unit 17 via an ECU 21 which is an electronic control unit configured to perform general control of the vehicle, calculate a maximum possible regenerative braking torque for the regenerative brake 34 according to a predefined rule based on a rotational frequency of the wheel 2 and a state of charge of a battery unit 19 and to actuate the regenerative brake 34 at a maximum torque for the given regenerative braking torque command when the maximum possible regenerative braking torque is smaller than the regenerative braking torque command, and wherein the load-responsive regenerative brake limiter 36 is configured to serve a function of reducing a braking torque generated by the regenerative brake 34, in priority to control performed by the maximally actuator 35.

The regenerative brake 34 may not be able to perform an efficient braking operation when the state of charge of the battery unit 19 is high and/or when the acceptable charge capacity of the battery unit 19 is low. The maximally actuator 35 may calculate a maximum possible regenerative braking torque and may maximize, within that commanded range, a braking torque generated by the regenerative brake 34. This may allow for utilizing a regenerative brake 34 as much as possible, while avoiding the possibility that the utilization of the regenerative brake 34 results in braking torque shortage. With such a configuration, in addition to the maximum utilization of a regenerative brake 34 based on the monitoring of a state of charge of a battery unit 19, possible slip of a tire caused by excessive regenerative braking with the regenerative brake 34 may be prevented with the aid of the load-responsive regenerative brake limiter 36. This may lead to a further enhanced level of utilization of the regenerative brake 34 while ensuring the prevention of possible slip.

In one embodiment of the present invention, the motor control circuitry 29 may further include a notifier 37 configured to notify the ECU 21 of a value of a regenerative braking torque at which the regenerative brake 34 functions, and wherein the ECU 21 includes a braking force allocator 38 configured to cause the mechanical brake 9 to apply a braking torque corresponding to a difference between the value of a regenerative braking torque notified from the notifier 37 and the regenerative braking torque command fed to the motor control circuitry 29. With such a configuration, the ECU 21 which is an electronic control unit configured to perform general control of the vehicle may be notified of, for example, reduction of a regenerative braking torque by the load-responsive regenerative brake limiter 36 and/or shortage of a regenerative braking torque, in view of the maximum possible regenerative braking torque calculated by the maximally actuator 35, with respect to a required regenerative braking torque according to the regenerative braking torque command. This may allow the ECU 21 to appropriately perform various controls to address the situation. In particular, the braking force allocator 38 may cause the mechanical brake 9 to apply a braking torque corresponding to a difference between the value of the reduced regenerative braking torque and the regenerative braking torque command. This may ensure that a total braking torque for the vehicle is secured, in spite of a reduced regenerative braking torque.

In one embodiment of the present invention, the load sensor 41 may be configured to serve a function of detecting, in addition to the load that acts along a direction in which the vehicle travels, a load that acts between a road surface and a tire along a widthwise direction of the vehicle, and the load-responsive regenerative brake limiter 36 may be configured to reduce a braking torque generated by the regenerative brake 34 when a value calculated—according to a predefined rule—based on the load that acts along a direction in which the vehicle travels and the load that acts along a widthwise direction of the vehicle which are outputted from the load sensor 41 reaches a preset value. When a vehicle is traveling on a curved road, a load that acts along a direction in which the vehicle travels may differ between left and right wheels 2 of the vehicle. Also, an additional load is incurred between a road surface and a tire along a widthwise direction of the vehicle. With the aforementioned configuration, the load-responsive regenerative brake limiter 36 may use both the load that acts along a widthwise direction of the vehicle and the load that acts along a direction in which the vehicle travels to determine whether or not to reduce a regenerative braking torque. In this way, it may be further ensured that possible slip of a tire caused by excessive regenerative braking with a regenerative brake 34 is prevented, while utilizing the regenerative brake 34 as much as possible.

In one embodiment of the present invention, the motor unit 6, together with the wheel bearing unit 4, may form an in-wheel motor drive system 8 that is partly or entirely disposed within the wheel 2, and wherein the in-wheel motor drive system 8 may include the motor unit 6 and the wheel bearing unit 4. The in-wheel motor drive system may include a reducer unit 7 configured to transmit to the wheel rotation with a speed that is reduced with respect to that of rotation of the motor unit 6. With the in-wheel motor drive system 8, a braking torque generated by a regenerative brake 34 may be transmitted right onto its corresponding wheel 2, so that allocation of torque among different wheels 2, 3 may not be available. Thus, minimizing possible slip of a tire may be all the more important. Thus, in such a configuration, prevention of possible slip according to the present invention may be all the more effective.

Where the in-wheel motor drive system 8 is employed, the in-wheel motor drive system, together with an inverter unit 22, may form an in-wheel motor unit 30, in which the inverter unit 22 may include the motor control circuitry 29 and a power circuitry 28 configured to supply a flow of drive current to the motor unit 6 under control of the motor control circuitry 29, and the motor control circuitry 29 may include the load-responsive regenerative brake limiter 36. Such a configuration in which the load-responsive regenerative brake limiter 36 is provided in the motor control circuitry 29 of the inverter unit 22 which is part of the in-wheel motor unit 30, may facilitate a simplified configuration of the ECU 21 that performs general control of the vehicle and/or facilitate simplification of controls that may be performed by the ECU 21. For instance, only a slight change or no change in the design or configuration of the ECU 21 may be necessitated by, for example, a change in the design or configuration of the in-wheel motor drive system 8.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
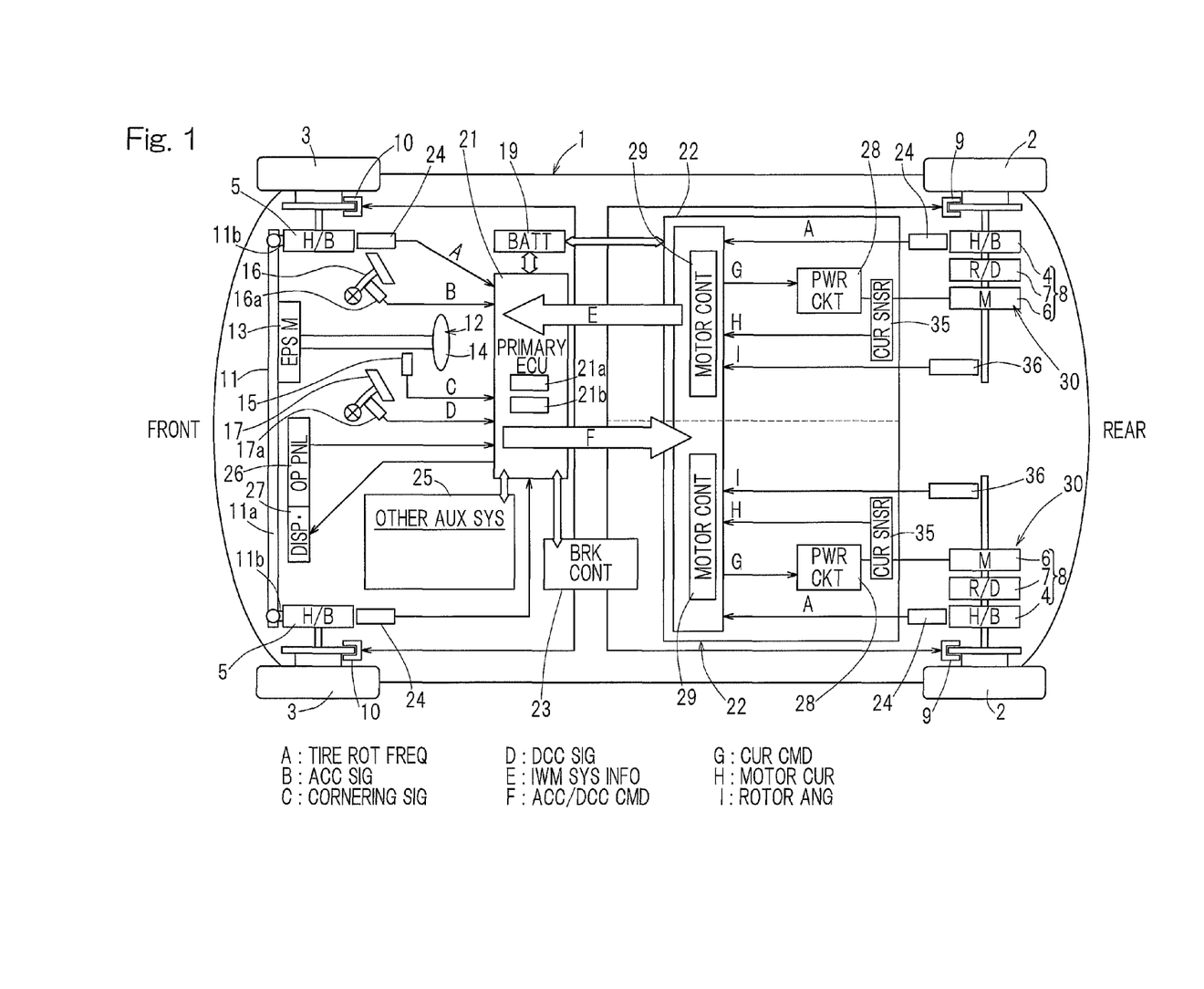
FIG. 1 is a block diagram of a schematic configuration of an electric vehicle, on a plan view, according to an embodiment of the present invention.

An embodiment of the present invention will now be described in connection with FIG. 1 to FIG. 11. The illustrated electric vehicle is a four-wheel vehicle that includes a vehicle body 1 with left and right rear wheels 2 and left and right front wheels 3, with the rear wheels being drive wheels and the front wheels being steered driven wheels. The wheels 2, 3—that is, drive wheels and driven wheels, respectively—are all equipped with tires and are supported by the vehicle body 1 via respective wheel bearing units 4, 5. In FIG. 1, the wheel bearing units 4, 5 are labeled with "H/B" which is an abbreviation for hub bearing. The left and right drive wheels 2, 2 may be driven by respective independent traction motor units 6, 6. Rotation of a motor unit 6 may be transmitted via a reducer unit 7 and through a wheel bearing unit 4 to a wheel 2. The motor unit 6, the reducer unit 7 and the wheel bearing unit 4 may be integrally assembled with each other to form an in-wheel motor drive system 8. The in-wheel motor drive system 8 may be partly or entirely disposed within a wheel 2. The motor unit 6 may, without the interposition of the reducer unit 7, directly drive a wheel 2 into rotation. Each in-wheel motor drive system 8 may, together with an inverter unit 22 which will be discussed later, form an in-wheel motor unit 30. The wheels 2, 3 may be equipped with respective mechanical friction brakes 9, 10 that may be electrically driven.

The left and right front steered wheels 3, 3 may be turnable via a turning mechanism 11 and steered with a steering mechanism 12. The turning mechanism 11 may include left and right knuckle arms 11b holding the respective wheel bearing units 5 and may also include a tie rod structure 11a configured to be laterally displaced to change the angles of the left and right knuckle arms 11b. The lateral movement of the tie rod structure 11a may be caused by an EPS (Electric Power Steering) motor 13 via a rotary to linear motion converter mechanism (not shown). The steering mechanism 12 may be a steer-by-wire steering mechanism configured to generate and transmit a drive command to the EPS motor 13, based on a steering command indicating a steering angle as sensed by a steering angle sensor 15 configured to sense a steering angle of a steering wheel 14 that is not mechanically coupled to the tie rod structure 11a.

A control system will be discussed. As illustrated, the vehicle body 1 may be equipped with a primary ECU 21 which is an electronic control unit configured to perform general control of the vehicle, an inverter unit 22 configured to perform control of the traction motor units 6 according to commands from the ECU 21, and a braking controller unit 23. The ECU 21 may include a computer, programs that may be executed by the computer, and various electronic circuits.

The ECU 21 may be generally divided, in terms of its functions, into a drive control subunit 21a and a general control subunit 21b. The drive control subunit 21a may be configured to generate an accelerating/decelerating command, which will be transmitted to the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. The drive control subunit 21a may also be configured to correct the accelerating/decelerating command, based on information produced from sensor(s) mounted to the vehicle such as information indicating a rotational frequency of a tire produced from a rotation sensor 24 operatively associated with each of the wheel bearing units 4, 5 equipped to the wheels 2, 3. The accelerator manipulation unit 16 may include an accelerator pedal and a sensor 16a configured to sense the depression of the accelerator pedal to generate the aforementioned accelerating signal. The brake manipulation unit 17 may include a brake pedal and a sensor 17a configured to sense the depression of the brake pedal to generate the aforementioned decelerating signal.

The general control subunit 21b of the ECU 21 may be configured to control various auxiliary systems 25, process input signals from an operation panel 26 on a console, cause a display 27 to show information, and/or etc. Examples of the auxiliary systems 25 may include an air conditioner, a lamp, a wiper, a GPS, and an airbag. In FIG. 1, the auxiliary systems 25 are indicated as a whole with a single block.

The braking controller unit 23, which may include electronic circuits and/or a microcomputer dedicated to a braking operation, may be configured to send a braking command to each of the mechanical brakes 9, 10 equipped to the wheels 2, 3, according to a braking-related command outputted from the ECU 21. A braking-related command produced from the primary ECU 21 may include, other than a command generated based on the decelerating signal produced from the brake manipulation unit 17, a command generated by a safety enhancement subunit that may be included in the ECU 21. The braking controller unit 23 may also include an anti-lock-braking system.

The inverter unit 22 may include a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor drive system 8 (which may be referred to as "IWM system information") held by the motor control circuitry 29, such as a variety of detected values or various control values, to the ECU 21. In the embodiment under discussion, the motor control circuitry 29 is provided one for each power circuitry 28. Furthermore, the inverter unit 22 includes one motor control circuitry 29 and one power circuitry 28. And the inverter unit 22, together with an in-wheel motor drive system 8 which includes a motor unit 6 that operates under control by that inverter unit 22, forms an in-wheel motor unit 30 in the aforementioned manner.

Figure 2:
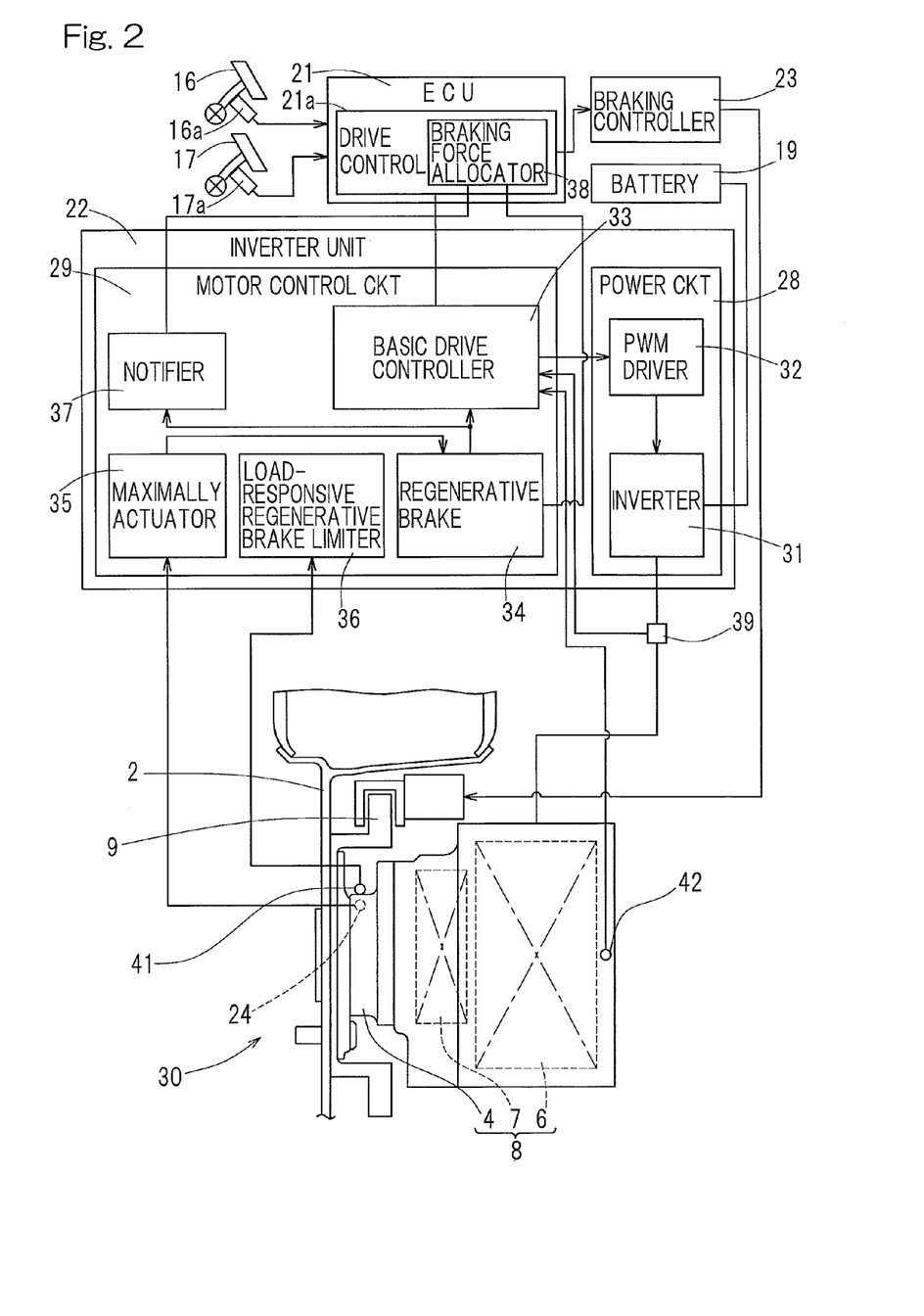
FIG. 2 is a block diagram of a schematic configuration of an in-wheel motor unit for the electric vehicle.

FIG. 2 is a block diagram showing a schematic configuration of the in-wheel motor unit 30. As illustrated, a power circuitry 28 of the inverter unit 22 may include an inverter 31 configured to convert a DC power from a battery unit 19 into a three-phase AC power used to drive the motor unit 6 and may include a PWM driver 32 configured to control the inverter 31. The motor unit 6 may include a three-phase synchronous motor such as an IPM (Interior Permanent Magnet) synchronous motor. The inverter 31 may include a plurality of semiconductor switching devices (not shown). The PWM driver 32 may be configured to perform pulse width modulation on a received current command to generate an ON/OFF command for each of the semiconductor switching devices.

A motor control circuitry 29 may include a computer, programs that may be executed by the computer, and various electronic circuits. The motor control circuitry 29 may include a basic drive controller 33 which serves as a basic control component. The basic drive controller 33 may be configured to receive the accelerating/decelerating command such as a torque command from the ECU 21 which serves as an upper-level control unit, convert the accelerating/decelerating command into a current command, and send the current command to the PWM driver 32 of a power circuitry 28. The basic drive controller 33 may be configured to perform a current feedback control based on the value of a motor current that flows from the inverter 31 to a motor unit 6 as sensed with a current sensor 39. The basic drive controller 33 may be configured to obtain a rotational angle of a motor rotor in the motor unit 6 as determined by an angle sensor 42 to perform control such as a vector control that relies on a rotational angle.

In the embodiment under discussion, the motor control circuitry 29 is provided with a regenerative brake 34, a maximally actuator 35 and a notifier 37, which will be described in detail later. And the ECU 21 is provided with a braking force allocator 38.

The regenerative brake 34 may operate the motor unit 6 as a power generator to apply a regenerative braking force to a wheel 2. The regenerative brake 34 may perform control to reduce a drive torque corresponding to an output of the basic drive controller 33, in response to a regenerative braking torque command fed from the braking force allocator 38 of the ECU 21. The regenerative brake 34 may serve a function of charging the battery unit 19 via the inverter 31 with the power generated by the motor unit 6.

The maximally actuator 35 may, when the motor control circuitry 29 is fed with a regenerative braking torque command from the brake manipulation unit 17 via the braking force allocator 38 of the ECU 21, calculate a maximum possible regenerative braking torque for the regenerative brake 34 according to a rule predetermined, for example, by a mathematical formula, based on a rotational frequency of a wheel 2 and a state of charge of the battery unit 19 and actuate the regenerative brake 34 at a maximum torque for the fed regenerative braking torque command when the maximum possible regenerative braking torque is smaller than the regenerative braking torque command. The maximally actuator 35 may use, for example, an output of the rotation sensor 24 associated with the wheel bearing unit 4 to obtain a rotational frequency of a wheel 2, and, may use, for example, an output of a state of charge detector (not shown) associated with the battery unit 19 to obtain a state of charge of the battery unit 19. The state of charge of a battery unit 19 referred to in this context may be a percentage of charged amount relative to a full capacity of the battery unit 19 or the remaining chargeable capacity of the battery unit 19.

The load-responsive regenerative brake limiter 36 may reduce a braking torque generated by the regenerative brake 34 when the value of a load $F_x$ that acts between a road surface and a tire along a direction in which the vehicle travels—as detected by a load sensor 41—reaches a preset value for limitation. The load-responsive regenerative brake limiter 36 may serve a function of reducing a braking torque generated by the regenerative brake 34, in priority to control performed by the maximally actuator 35. The load-responsive regenerative brake limiter 36 may, after an output of the load sensor 41 reaches the preset value for limitation and the limiter 36 reduces a braking torque generated by the regenerative brake 34, halt control to reduce a braking torque generated by the regenerative brake 34 when an output of the load sensor 41 becomes equal to or less than a recovery preset value that is smaller than the preset value referred to above. The aforementioned preset values as well as the level to which a braking torque generated by the regenerative brake 34 is reduced may be determined with appropriate considerations such as by performing a simulation. A load sensor 41 may be associated with a wheel bearing unit 4—a particular example of which will be discussed later.

In addition to performing control based on a load $F_x$ that acts along a direction in which the vehicle travels that is outputted from a load sensor 41, the load-responsive regenerative brake limiter 36 may reduce a braking torque generated by the regenerative brake when a value calculated—according to a predetermined rule—based on the load $F_x$ that acts along a direction in which the vehicle travels and a load $F_y$ that acts along a widthwise direction of the vehicle which are outputted from the load sensor 41 reaches a preset value. In such a case, the load sensor 41 may serve a function of detecting, in addition to the load $F_x$ that acts along a direction in which the vehicle travels, a load $F_y$ that acts between a road surface and a tire along a widthwise direction of the vehicle. In a variant, an additional load sensor (not shown) may be provided which is configured to determine a load $F_y$ that acts along a widthwise direction of the vehicle.

The notifier 37 may notify the ECU of the value of a regenerative braking torque at which the regenerative brake 34 functions.

The braking force allocator 38 of the ECU 21 divides a total braking torque command that may be given in the form of a decelerating signal produced from the brake manipulation unit 17, into a regenerative braking torque command for regenerative brakes 34 and a braking torque command for mechanical brakes 9, 10. The braking force allocator 38 may perform braking torque control by which the allocator 38 causes mechanical brakes 9, 10 to apply a braking torque corresponding to a difference between the value of a regenerative braking torque notified from the notifier 37 and the regenerative braking torque command fed to the motor control circuitry 29. The braking force allocator 38 may send braking torque commands for mechanical brakes 9, 210, through the braking controller unit 23, to the mechanical brakes 9, 10.

Figure 3A:
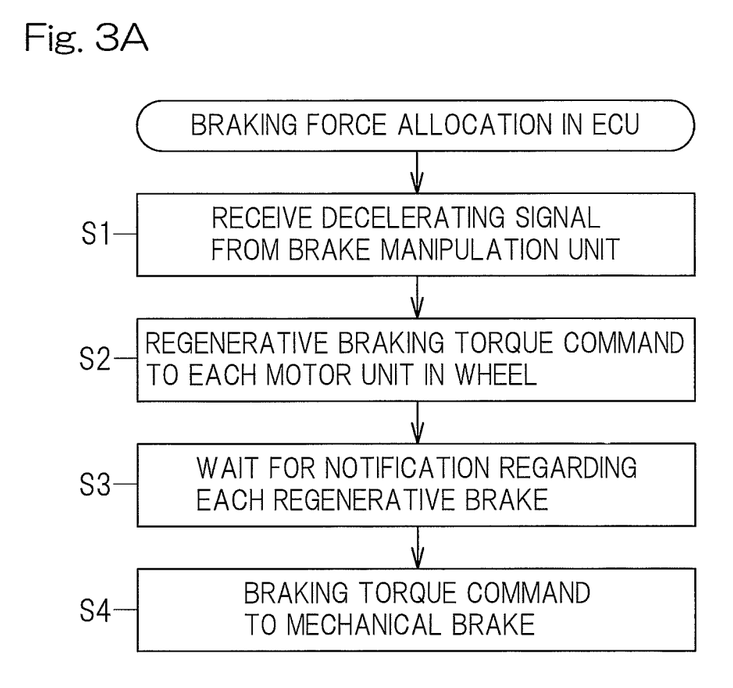
FIG. 3A is a flowchart of control that may be performed by a braking force allocator in an ECU for the electric vehicle.
Figure 3B:
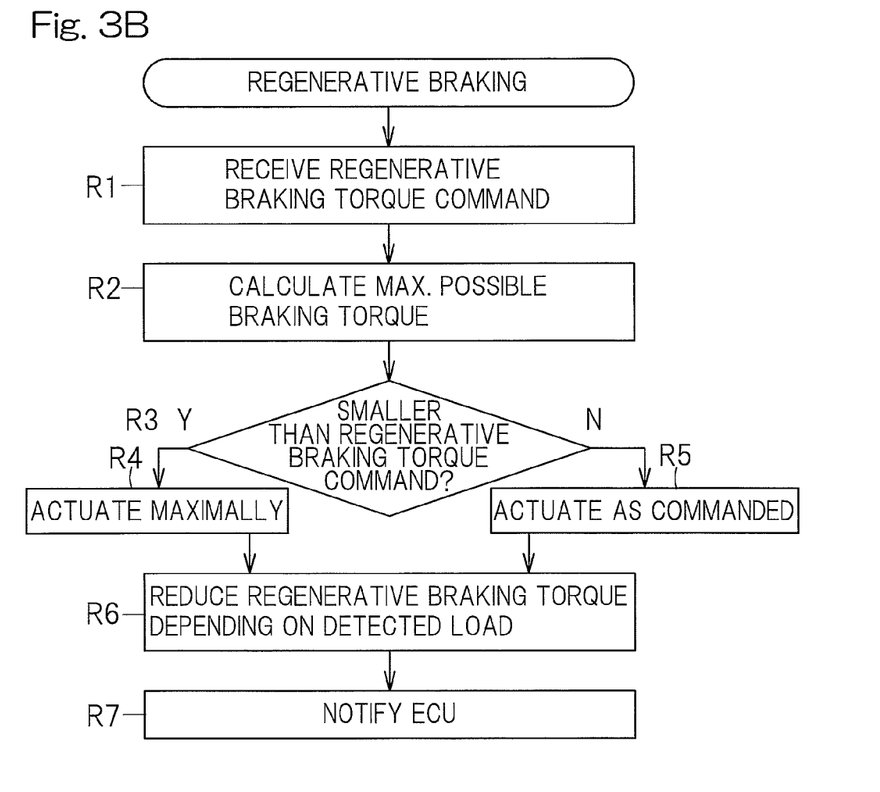
FIG. 3B is a flowchart of control that may be performed by a maximally actuator and a load-responsive regenerative brake limiter for the electric vehicle.

Next, details of a braking operation and the functions of the components 35 to 38 according to the aforementioned configuration will be described. FIG. 3A shows a control operation that may be performed by the braking force allocator 38 of the ECU 21, while FIG. 3B shows a control operation that may be performed by the maximally actuator 35 and the load-responsive regenerative brake limiter 36. Referring to FIG. 3A, a decelerating signal produced from the brake manipulation unit 17 may be inputted to the ECU 21 as a braking torque command (Step S1). Then the braking force allocator 38 may output an allocation of the braking torque command to the motor control circuitry 29 that is associated with each motor unit 6 equipped to a wheel 2 (Step S2). Here, the braking force allocator 38 may, in response to a braking torque command from the brake manipulation unit 17, output exclusively a regenerative braking torque command when the braking torque command falls within a defined normal range of braking torques—thus, sending no braking torque command to the mechanical brakes 9, 10—unless, for example, at the time of emergency braking. Subsequently, the braking force allocator 38 may wait for notification from the notifier 37 which may be operatively associated with regenerative brakes 34 (Step S3).

The regenerative braking torque command from the braking force allocator 38 may be inputted to the maximally actuator 35 of the motor control circuitry 29 (Step R1 in FIG. 3B). Then the maximally actuator 35 calculates a maximum possible regenerative braking torque for a regenerative brake 34 based on a rotational frequency of a wheel 2 and a state of charge of the battery unit 19 (Step R2). The calculation may be performed according to a rule that may be defined by a mathematical formula.

Figure 4:
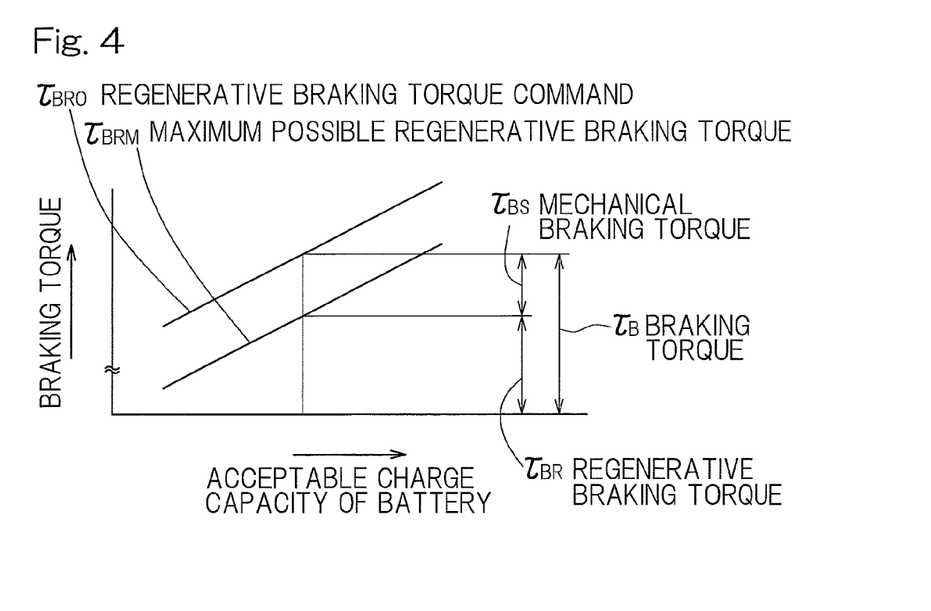
FIG. 4 is a graph that illustrates a relationship among an acceptable charge capacity of a battery unit, a regenerative braking torque and a mechanical braking torque for the electric vehicle.

As shown in FIG. 4, a maximum possible regenerative braking torque $\tau_{BRM}$ increases in proportion to an acceptable charge capacity of a battery unit, provided that the acceptable charge capacity is equal to or greater than a certain value. The maximally actuator 35 may, after performing the aforementioned calculation, compare between the maximum possible regenerative braking torque $\tau_{BRM}$ and the regenerative braking torque command $\tau_{BRO}$ (Step R3). The maximally actuator 35 may actuate the regenerative brake 34 at a maximum torque for the given regenerative braking torque command $\tau_{BRO}$ if the maximum possible regenerative braking torque $\tau_{BRM}$ is smaller than the regenerative braking torque command $\tau_{BRO}$ (Step R4). The shortage braking torque may be supplemented by the actuation of mechanical brakes 9, 10. In other words, the braking torque $\tau_B$ required for braking function may be divided into a regenerative braking torque $\tau_{BR}$ and a braking torque $\tau_{BS}$ caused by the mechanical brakes 9, 10. The maximally actuator 35 may cause the regenerative brake 34 to generate a regenerative braking torque corresponding to the given regenerative braking torque command $\tau_{BRO}$ if the maximum possible regenerative braking torque $\tau_{BRM}$ is equal to or greater than the regenerative braking torque command $\tau_{BRO}$ (Step R5).

The load-responsive regenerative brake limiter 36 may, when a regenerative braking torque command is inputted to the motor control circuitry 29, compare against the preset value for limitation the value of a load $F_x$ that acts between a road surface and a tire along a direction in which the vehicle travels—as determined by the load sensor 41—to reduce a braking torque generated by the regenerative brake 34 when the load $F_x$ that acts along a direction in which the vehicle travels reaches the preset value for limitation (Step R6). The control to recude the braking torque may be performed in priority to control performed by the maximally actuator 35. Subsequently, the notifier 37 may notify the ECU 21 of the value of a regenerative braking torque at which the regenerative brake 34 functions (Step R7).

The braking force allocator 38 of the ECU 21 may cause, through the braking controller unit 23, mechanical brakes 9, 10 to apply a braking torque corresponding to a difference between the value of a regenerative braking torque notified from the notifier 37 and the regenerative braking torque command fed to the motor control circuitry 29 (Step S4). The braking controller unit 23 may, in principle, perform control by which the unit 23 causes a mechanical brake 9 equipped to a wheel 2 for which a regenerative braking torque is reduced to apply a braking torque corresponding to the reduced regenerative braking torque to the same wheel 2. In a variant, however, the braking controller unit 23 may also allocate among other mechanical brakes 9, 10, a braking torque corresponding to the reduced regenerative braking torque.

Although not shown in the flowcharts of FIG. 3A and FIG. 3B, the load-responsive regenerative brake limiter 36 may, after an output of the load sensor 41 reaches the preset value for limitation and the limiter 36 reduces a braking torque generated by the regenerative brake 34, halt control by which a braking torque generated by the regenerative brake 34 is reduced when an output of the load sensor 41 becomes equal to or less than the recovery preset value that is smaller than the preset value.

With an electric vehicle having such a configuration—just as discussed earlier—a braking torque generated by a regenerative brake 34 may be reduced depending on a load that acts between a road surface and a tire, thus preventing possible slip of a tire caused by excessive regenerative braking with the regenerative brake 34.

In particular, braking with the regenerative brake 34 may be limited depending on a load that is actually acting from a road surface to a tire and vice versa. Such a configuration may—unlike a configuration in which regenerative braking is limited based on detected values of a drive torque of a motor unit 6 and/or a rotational speed of a wheel—may enable appropriate and prompt control to be carried out, for example, regardless of changes in the condition of a road surface and/or even when a tire loses contact with a road surface. In this way, possible slip of a tire caused by excessive regenerative braking with a regenerative brake 34 may be prevented, while utilizing the regenerative brake 34 as much as possible.

The embodiment under discussion is applied to an in-wheel motor drive system 8. With an in-wheel motor drive system 8, a braking torque may be transmitted right onto its corresponding wheel 2, so that allocation of torque among different wheels 2, 3 may not be available. Thus, minimizing possible slip of a tire may be all the more important. Thus, in such a configuration, prevention of possible slip that may be enabled by the provision of the load-responsive regenerative brake limiter 36 may be all the more effective.

The load-responsive regenerative brake limiter 36 may, after an output of the load sensor 41 reaches a preset value and the limiter 36 reduces a braking torque generated by the regenerative brake 34, halt control to reduce a braking torque generated by the regenerative brake when an output of the load sensor 41 becomes equal to or less than a smaller, recovery preset value. If a load that acts between a road surface and a tire along a direction in which the vehicle travels decreases, it may no longer be necessary to reduce a braking torque generated by a regenerative brake 34. In this case, halt of such a reduction-inducing control may allow for utilizing the regenerative brake as much as possible, thus enabling the corresponding recovery of energy.

Further, the following advantages may be offered by the provision of the maximally actuator 35: The regenerative brake 34 may not be able to perform an efficient braking operation when the percentage of charged amount of the battery unit 19 is high and/or when the acceptable charge capacity of the battery unit 19 is low. The maximally actuator 35 may calculate a maximum possible regenerative braking torque $\tau_{BRM}$ and may maximize, within that commanded range, a braking torque generated by the regenerative brake 34. This may allow for utilizing a regenerative brake 34 as much as possible, while avoiding the possibility that the utilization of the regenerative brake 34 results in braking torque shortage. With such a configuration, in addition to the maximum utilization of a regenerative brake 34 based on the monitoring of a state of charge of the battery unit, possible slip of a tire caused by excessive regenerative braking with the regenerative brake 34 may be prevented with the aid of the load-responsive regenerative brake limiter 36. This may lead to a further enhanced level of utilization of the regenerative while ensuring the prevention of possible slip.

Now, a particular configuration that the in-wheel motor drive system 8 may take will be described in connection with FIG. 5 to FIG. 7. As illustrated, the in-wheel motor drive system 8 may include a wheel bearing unit 4, a motor unit 6 and a reducer unit 7 interposed between the wheel bearing unit 4 and the motor unit 6, such that the hub of a drive wheel 2 supported by the wheel bearing unit 4 is coupled coaxially with a rotational output shaft 74 of the motor unit 6. As illustrated, the reducer unit 7 may include a cycloidal reducer which includes a rotational input shaft 82 connected coaxially to the rotational output shaft 74 of the motor unit 6. The rotational input shaft 82 may include eccentric segments 82a, 82b. The cycloidal reducer may also include curvilinear plates 84a, 84b mounted via respective bearings 85 to the eccentric segments 82a, 82b, such that the eccentric motions of the curvilinear plates 84a, 84b are transmitted so as to cause a rotary motion of the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 may include an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 may concurrently serve as a hub for mounting a drive wheel. As illustrated, the wheel bearing unit 4 may include a double row angular contact ball bearing, in which the rolling elements 55 are in the form of balls rollingly retained by a retainer 56 that is provided one for each row of the balls. The raceway surfaces 53 and 54 may have arcuate cross sectional shapes and may be formed to have respective contact angles held in back-to-back relation with each other. The outer member 51 and the inner member 52 may define an annular bearing space therebetween, and an outboard end of the annular bearing space may be sealed by a sealing member 57.

The outer member 51, which may serve as a stationary member, may be of one piece construction having a flange 51a for attaching to an outboard housing 83b of the reducer unit 7. The flange 51a may have bolt insertion holes 64 formed at a plurality of circumferential locations thereof. The housing 83b may have bolt receiving holes 94 that are internally threaded at locations thereof corresponding to the respective bolt insertion holes 64. The outer member 51 may be mounted to the housing 83b by screwing into the bolt receiving holes 94 the mounting bolts 65 that are pre-inserted in the bolt insertion holes 64.

The inner member 52, which may serve as a rotational member, may include an outboard member 59 having a hub flange 59a for attaching a wheel. The inner member 52 may include an inboard member 60. The inboard member 60 may have an outboard side fitted to an inner periphery of the outboard member 59 and may be crimped to be integrated with the outboard member 59. The outboard member 59 and the inboard member 60 may have the corresponding rows of the raceway surfaces 54 formed thereon. The inboard member 60 may have a center thereof formed with a through bore 61. The hub flange 59a may have force-fitting holes 67 at a plurality of circumferential locations thereof for receiving corresponding hub bolts 66. The outboard member 59 may have a cylindrical pilot portion 63 for guiding a drive wheel and brake components (both not shown). The pilot portion 63 may be located in the vicinity of the root of the hub flange 59a of the outboard member 59 and may protrude towards the outboard side. A cap 68 closing an outboard end of the through bore 61 may be fitted to an inner periphery of the pilot portion 63.

The reducer unit 7 may include a cycloidal reducer as discussed earlier. As shown in FIG. 6, the cycloidal reducer may include two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 may be fitted to the housing 83b to guide, along the outer peripheries thereof, the eccentric motions of the curvilinear plates 84a and 84b. A plurality of inner pins 88, which may be fitted to the inboard member 60 of the inner member 52, may be inserted to a plurality of corresponding, round through holes 89 formed in each of the curvilinear plates 84a and 84b, to engage with the through holes 89. The rotational input shaft 82 may be splinedly connected to the rotational output shaft 74 of the motor unit 6 for co-rotation. The rotational input shaft 82 may be supported on both sides thereof, via two bearings 90, by an inboard housing 83a and by an inner diameter surface of the inboard member 60 of the inner member 52, respectively.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 engaging with the through holes 89, transmitted to cause a rotary motion of the inner member 52. The speed of rotation of the inner member 52 is reduced with respect to that of rotation of the rotational output shaft 74. For example, a single-stage reducer unit having such a configuration can achieve a reduction ratio of 10 or greater.

The two curvilinear plates 84a, 84b may be mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, may be each disposed at a side of the corresponding one of the eccentric segments 82a, 82b, in such a way that the counterweights 91 face each other across the eccentric segments 82a, 82b while each of the counterweights 91 is displaced in a direction opposite to the direction of displacement of the corresponding one of the eccentric segments 82a, 82b. In this way, vibrations that may be caused by the curvilinear plates 84a, 84b can be cancelled out.

Figure 7:
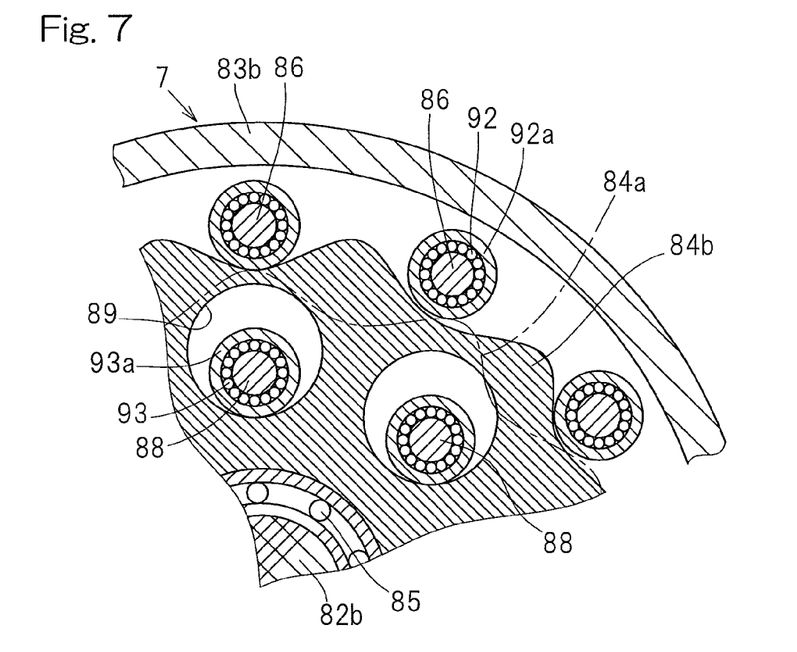
FIG. 7 is a fragmentary enlarged cross sectional view of FIG. 6.

As shown on an enlarged scale in FIG. 7, bearings 92 and bearings 93 may be fitted to the outer pins 86 and the inner pins 88, respectively. The outer rings 92a of the bearings 92 may be in rolling contact with the outer peripheries of the curvilinear plates 84a, 84b, while the outer rings 93a of the bearings 93 may be in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing the eccentric motions of the curvilinear plates 84a, 84b to be more smoothly transmitted to cause a rotary motion of the inner member 52.

Figure 5:
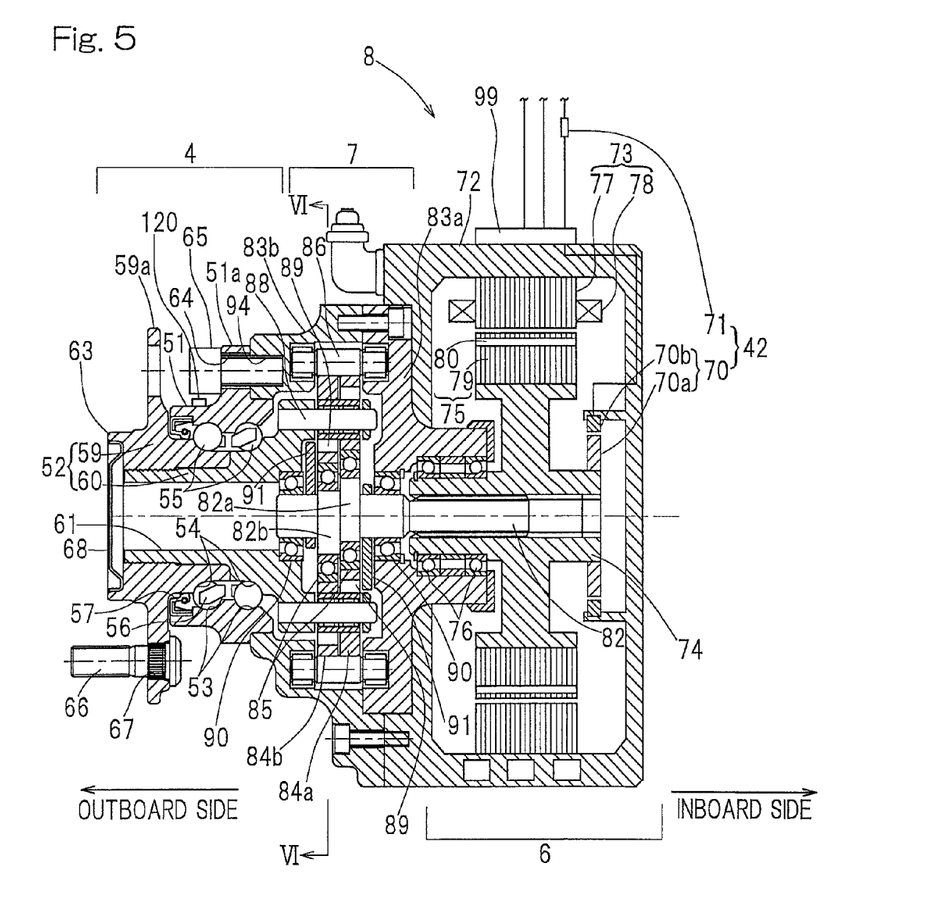
FIG. 5 is a front cut-away view of an in-wheel motor drive system for the electric vehicle.
Figure 6:
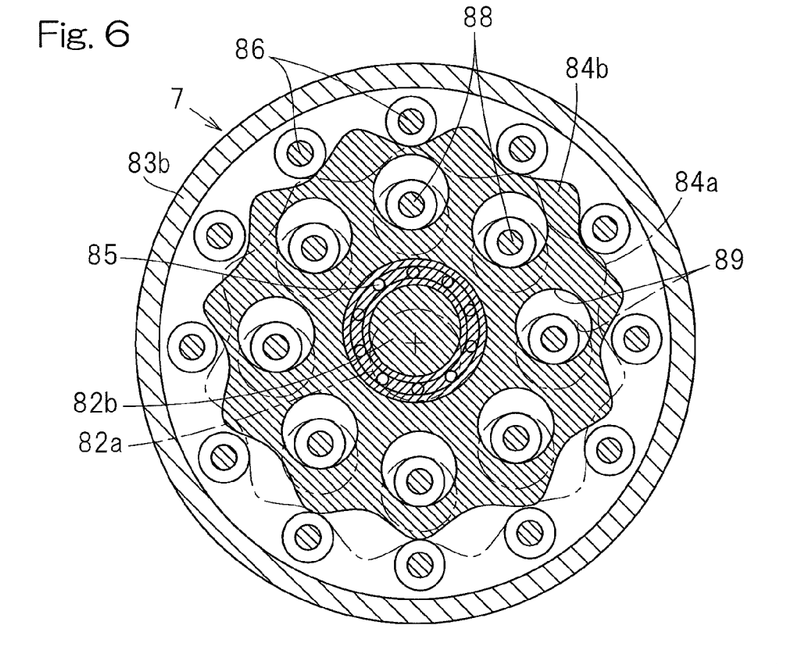
FIG. 6 is a cross sectional view of FIG. 5 taken along the line VI-VI.

As shown in FIG. 5, the motor unit 6 may include a radial-gap type, IPM motor that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 may be cantilevered via two bearings 76 to a tubular segment of the inboard housing 83a of the reducer unit 7.

The motor stator 73 may include a stator core body 77 made of soft magnetic material and may also include coils 78. An outer peripheral surface of the stator core body 77 may be fitted to the inner peripheral surface of the motor housing 72. In this way, the stator core body 77 may be supported by the motor housing 72. The motor rotor 75 may include a rotor core body 79 mounted onto the rotational output shaft 74 to be coaxial with the motor stator 73 and may also include a plurality of permanent magnets 80 incorporated in the rotor core body 79.

The motor unit 6 may be associated with an angle sensor 42 that may sense a rotational angle of the motor rotor 75 relative to the motor stator 73. The angle sensor 42 may include an angle sensor body 70 that senses signals representing a rotational angle of the motor rotor 75 relative to the motor stator 73 for output and may also include an angle calculation circuit 71 that calculates a rotational angle based on the signals produced from the angle sensor body 70. The angle sensor body 70 may include a detectable element 70a associated with the outer peripheral surface of the rotational output shaft 74 and may also include a detector element 70b associated with the motor housing 72. For example, the detector element 70b may be positioned adjacent the detectable element 70a in a radially opposed fashion. The detectable element 70a and the detector element 70b may be positioned adjacent each other in an axially opposed fashion.

Here, the angle sensor 42 may include a magnetic encoder or a resolver. Control of the rotation of the motor unit 6 may be carried out by the aforementioned motor control circuitry 29 (e.g., see FIG. 1 and FIG. 2). To maximize the efficiency of the motor unit 6, the basic drive controller 33 of the motor control circuitry 29 may control the timings at which respective phase alternating currents are supplied to the coils 78 of the motor stator 73, based on the rotational angle of the motor rotor 75 relative to the motor stator 73 as determined by the angle sensor 42.

A connector 99 may be formed at the motor housing 72 for connection of the wires for a motor current in the in-wheel motor drive system 8, wires for various sensors, wires for various commands, and etc.

Figure 8:
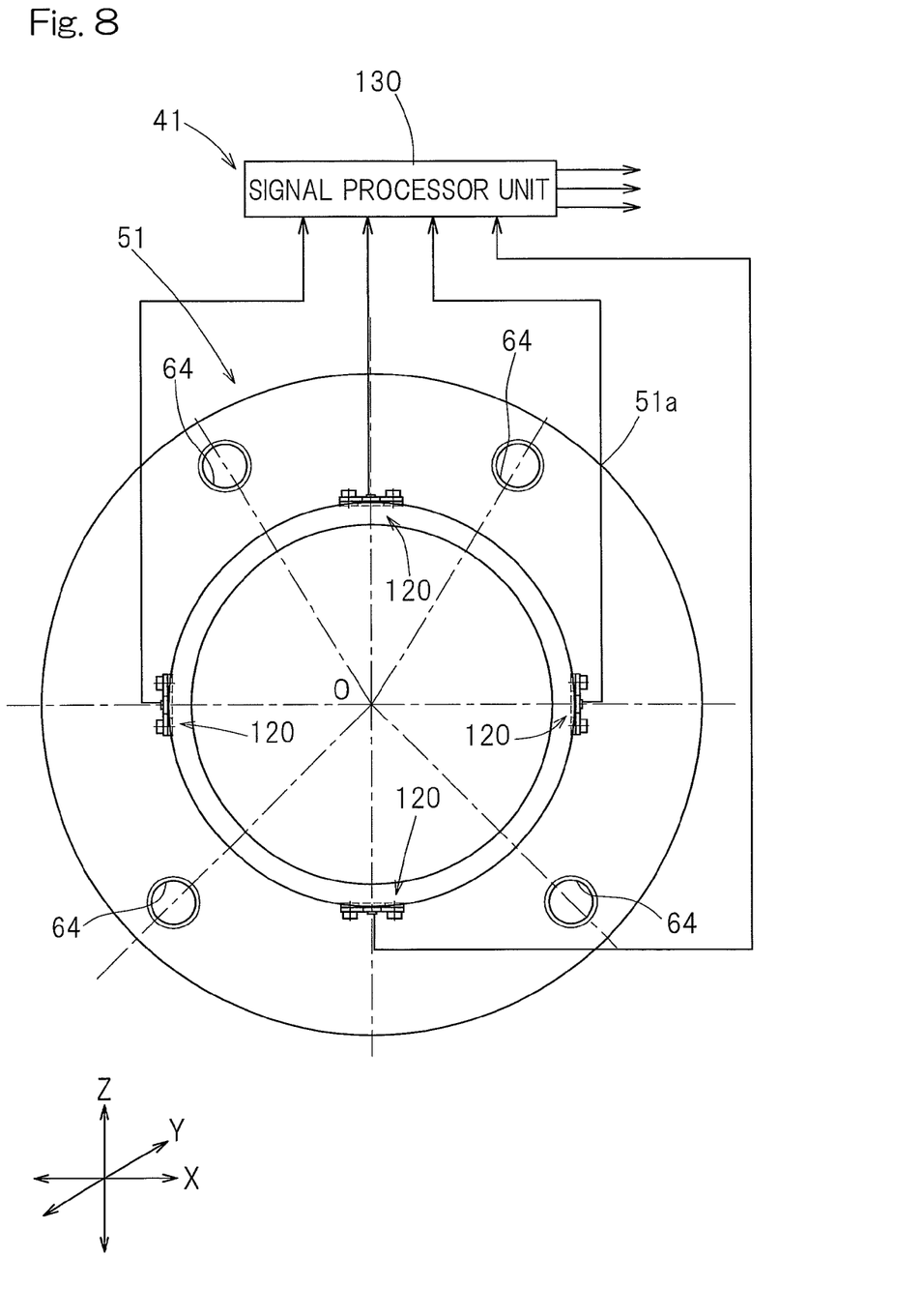
FIG. 8 shows a side view of an outer member of a wheel bearing unit for the electric vehicle, as illustrated in combination with a signal processor unit for load detection.

A load sensor 41 as shown in FIG. 2 may include a plurality of sensor units 120 such as shown in FIG. 8 and may also include a signal processor unit 130 that processes output signals of the sensor units 120. As illustrated, a sensor unit 120 may be provided at four locations of an outer diameter surface of the outer member 51 which may serve as a stationary member of a wheel bearing unit 4. FIG. 8 illustrates a front view of the outer member 51 as viewed from an outboard side. As illustrated, the sensor units 120 may be positioned at upper, lower, right and left parts, respectively, of the outer diameter surface of the outer member 51, with the upper and lower parts corresponding to vertical regions relative to a tire in contact with a road surface and the right and left parts corresponding to horizontal regions relative to a tire in contact with a road surface. The signal processor unit 130 may be disposed on or at the outer member 51, or may be included in a motor control circuitry 29 of an inverter unit 22.

The signal processor unit 130 may compare the outputs of the sensor units 120 provided at four locations and determine, according to a defined calculation formula, the respective loads applied to a wheel bearing unit 4—in particular, a vertical load $F_z$ that acts between a road surface and a tire equipped to a wheel 2, a load $F_x$ that acts along a direction in which the vehicle travels and that may work as a drive force or a brake force, and/or an axial load $F_y$, for output. The four sensor units 120 may be evenly disposed on upper, lower, right and left parts, respectively, of an outer diameter surface of the outer member 51 such that the four sensor units 120 are positioned to be circumferentially 90° out of phase from each other, with the upper and lower parts corresponding to vertical regions relative to a tire in contact with a road surface and the right and left parts corresponding to horizontal regions relative to a tire in contact with a road surface. This may allow for more accurate estimation of a vertical load $F_z$, a load $F_x$ that acts along a direction in which the vehicle travels, and/or an axial load $F_y$—which may be applied to a wheel bearing unit 4. A vertical load $F_z$ may be determined based on comparison between the outputs of the upper and lower sensor units 120. A load $F_x$ that acts along a direction in which the vehicle travels may be determined based on comparison between the outputs of the rear and front sensor units 120. An axial load $F_y$ may be determined based on comparison between the outputs of the four sensor units 120. The calculation formula(s) and/or parameter(s) that may be used in determination of the loads $F_x$, $F_y$, $F_z$ may be defined based on experiment and/or simulation results, to achieve more precise determination of the load(s) by the signal processor unit 130. Note that the aforementioned determination may include various correction procedures, which will not be discussed herein for the purpose of simplicity.

Figure 9:
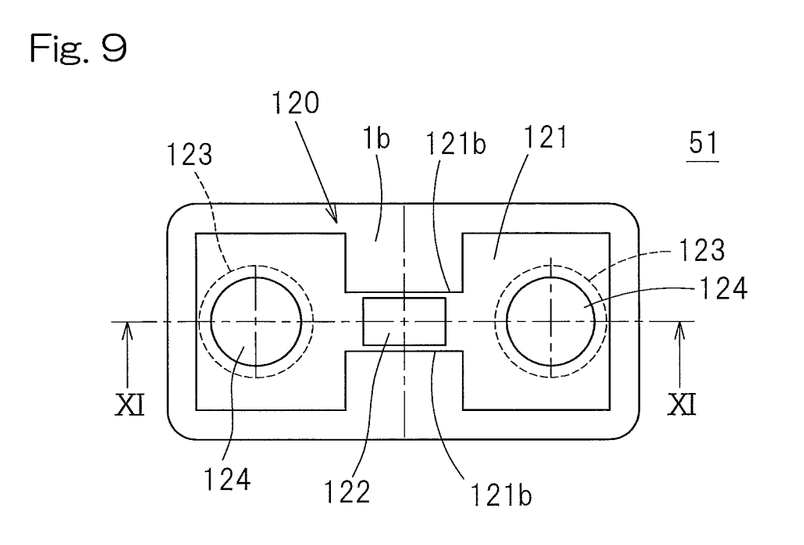
FIG. 9 is an enlarged plan view of a sensor unit for the electric vehicle.
Figure 10:
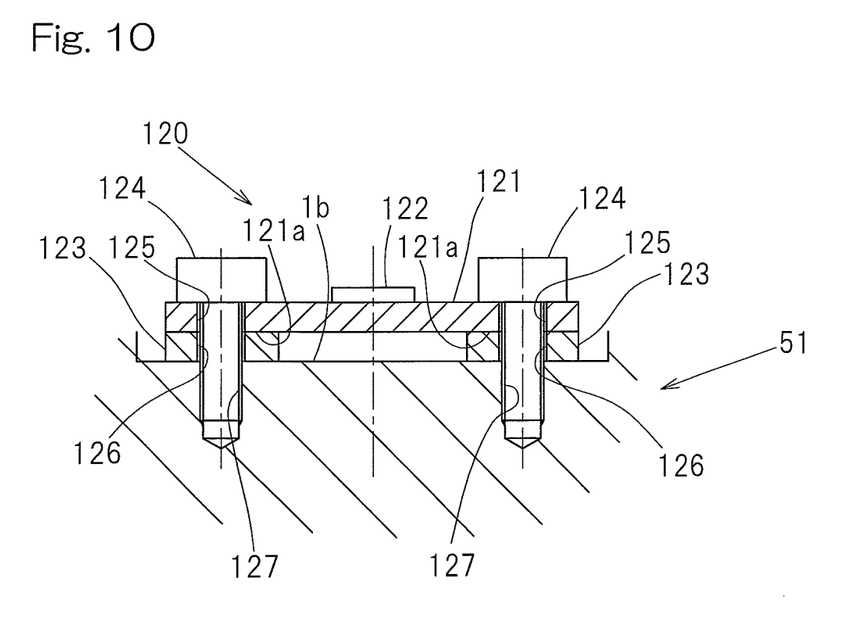
FIG. 10 is a longitudinal cross sectional view of the sensor unit.

As shown in an enlarged plan view of FIG. 9 and an enlarged longitudinal cross sectional view of FIG. 10, each of the sensor units 120 may include a strain generator member 121 and a strain sensor 122 mounted on the strain generator member 121 to sense strain in the strain generator member 121. The strain generator member 121 may include an elastically deformable, metal plate, such as a steel plate, that may have a thickness of 3 mm or less. The metal plate may have a shape of a strip with a generally uniform width along its length as viewed on a plan view. The metal plate may have cutouts 121b formed at a center thereof on opposite sides. The strain generator member 121 may include, at opposite ends, two fixation contact segments 121a that are fixedly in contact through respective spacers 123 with an outer diameter surface of the outer member 51. The strain sensor 122 may be affixed on the strain generator member 121 at a location where a larger strain occurs in response to application of loads of various directions. As illustrated, the strain sensor 122 may be placed on an outer face of the strain generator member 121 so as to be positioned at a center of the strain generator member 121 where the strain sensor 122 is positioned between the cutouts 121b formed on opposite sides of the strain generator member 121. In this way, the strain sensor 122 can sense strain in the strain generator member 121 that occurs in the vicinity of the cutouts 121b along a circumferential direction of the strain generator member 121.

Each of the sensor unit 120 may be such that two fixation contact segments 121a of a strain generator member 121 are arranged at respective positions with respect to axial direction of the outer member 51 and spaced from each other along a circumferential direction of an outer diameter surface of the outer member 51. The fixation contact segments 121a may be fixedly associated through respective spacers 123, with corresponding bolts 124, to an outer diameter surface of the outer member 51. The bolts 124 may be inserted into bolt insertion radial through holes 125 formed in the respective fixation contact segments 121a, may be passed through bolt insertion holes 126 formed in the spacers 123, and may be screwed into threaded holes 127 formed in an outer periphery of the outer member 51. With such a configuration of fixedly associating the fixation contact segments 121a through respective spacers 123 to an outer diameter surface of the outer member 51, a center of the thin-plate, strain generator member 121 where the cutouts 121b are formed can be physically separated from an outer diameter surface of the outer member 51, thus facilitating strain-induced deformation of the strain generator member 121 in the vicinity of the cutouts 121b. As illustrated, the fixation contact segments 121a may be positioned on respective axial locations which are in the vicinity of an outboard row of raceway surfaces 53 of the outer member 51. The vicinity of an outboard row of raceway surfaces 53 of the outer member 51 used herein refers to a region starting from the center between an inboard row of raceways surfaces 53 and an outboard row of raceway surfaces 53 and extending to the area where the outboard row of raceway surfaces 53 is formed, so as to accommodate that area. An outer diameter surface of the outer member 51 may include a flat segment 1b with which the spacers 123 are fixedly in contact.

Various types of a strain sensor 122 may be used. For example, a stain sensor 122 may include a metal foil strain gauge. In such a case, the strain sensor 122 is typically glued and fixed to the strain generator member 121. In a variant, a strain sensor 122 may include a thick film resistor formed on the strain generator member 121.

Figure 11:
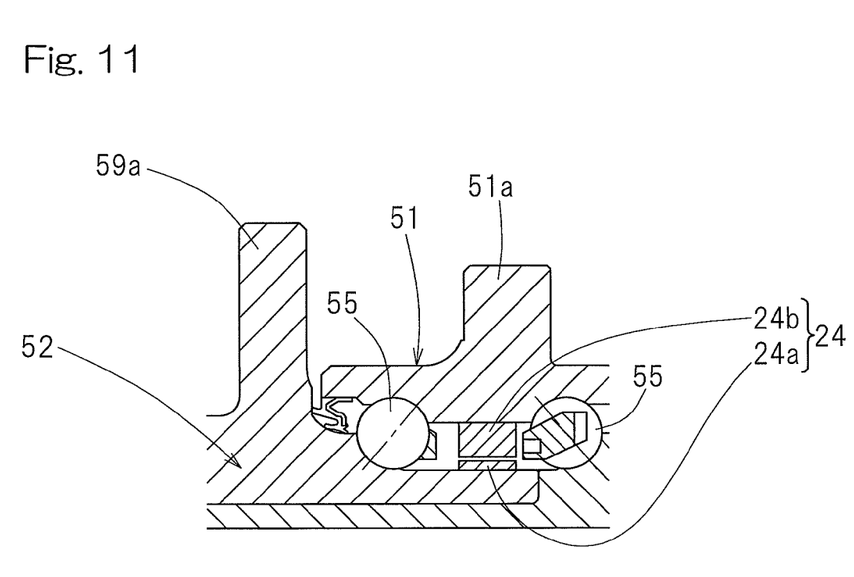
FIG. 11 is a longitudinal cross sectional view of an example of a rotation sensor for the electric vehicle.

FIG. 11 illustrates an example of the rotation sensor 24 as shown in FIG. 1 and FIG. 2. As illustrated, a rotation sensor 24 may include a magnetic encoder 24a associated with an outer periphery of the inner member 52 of the wheel bearing unit 4 and may also include a magnetic sensor 24b associated with the outer member 51 in face-to-face relation with the magnetic encoder 24a. The magnetic encoder 24a may include a ring-shaped member magnetized with N poles and S poles that alternate with each other along a circumferential direction of the ring-shaped member. As in the illustrated example, the rotation sensor 24 may be positioned between the plural rows of rolling elements 55, 55. In a variant, the rotation sensor 24 may be positioned at an end of the wheel bearing unit 4.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Vehicle body
2, 3: Wheel
4, 5: Wheel bearing unit
6: Motor unit
7: Reducer unit
8: In-wheel motor drive system
9, 10: Mechanical brake
11: Turning mechanism
12: Steering mechanism
19: Battery unit
21: ECU
22: Inverter unit
24: Rotation sensor
28: Power circuitry
29: Motor control circuitry
30: In-wheel motor unit
31: Inverter
32: PWM driver
33: Basic drive controller
34: Regenerative brake
35: Maximally actuator
36: Load-responsive regenerative brake limiter
37: Notifier
38: Braking force allocator
39: Current sensor
41: Load sensor
42: Angle sensor

What is claimed is:

1. An electric vehicle comprising:
a motor unit configured to drive a wheel;
a motor control circuitry configured to control the motor unit, the motor control circuitry including a regenerative brake configured to operate the motor unit as a power generator to apply a regenerative braking force to the wheel;
a mechanical brake configured to mechanically apply a braking force to the wheel;
a wheel bearing unit supporting the wheel;
a load sensor associated with the wheel bearing unit, the load sensor being configured to detect a load that acts between a road surface and a tire along a direction in which the vehicle travels; and
a load-responsive regenerative brake limiter configured to reduce a braking torque generated by the regenerative brake when an output of the load sensor reaches a preset value,
wherein the load-responsive regenerative brake limiter is configured to, after an output of the load sensor reaches the preset value and the braking torque generated by the regenerative brake is reduced, halt control performed to reduce a braking torque generated by the regenerative brake when an output of the load sensor becomes equal to or less than a recovery preset value that is smaller than the preset value.

2. An electric vehicle comprising:
a motor unit configured to drive a wheel;
a motor control circuitry configured to control the motor unit, the motor control circuitry including a regenerative brake configured to operate the motor unit as a power generator to apply a regenerative braking force to the wheel;
a mechanical brake configured to mechanically apply a braking force to the wheel;
a wheel bearing unit supporting the wheel;
a load sensor associated with the wheel bearing unit, the load sensor being configured to detect a load that acts between a road surface and a tire along a direction in which the vehicle travels; and
a load-responsive regenerative brake limiter configured to reduce a braking torque generated by the regenerative brake when an output of the load sensor reaches a preset value,
wherein the motor control circuitry further includes a maximally actuator configured to, when the motor control circuitry is fed with a regenerative braking torque command from a brake manipulation unit via an ECU which is an electronic control unit configured to perform general control of the vehicle, calculate a maximum possible regenerative braking torque for the regenerative brake according to a predefined rule based on a rotational frequency of the wheel and a state of charge of a battery unit and to actuate the regenerative brake at a maximum torque for the given regenerative braking torque command when the maximum possible regenerative braking torque is smaller than the regenerative braking torque command, and wherein the load-responsive regenerative brake limiter is configured to serve a function of reducing a braking torque generated by the regenerative brake, in priority to control performed by the maximally actuator.

3. The electric vehicle as claimed in claim 2, wherein the motor control circuitry further includes a notifier configured to notify the ECU of a value of a regenerative braking torque at which the regenerative brake functions, and wherein the ECU includes a braking force allocator configured to cause the mechanical brake to apply a braking torque corresponding to a difference between the value of a regenerative braking torque notified from the notifier and the regenerative braking torque command fed to the motor control circuitry.

4. The electric vehicle as claimed in claim 1, wherein the load sensor is configured to serve a function of detecting, in addition to the load that acts along a direction in which the vehicle travels, a load that acts between a road surface and a tire along a widthwise direction of the vehicle, and wherein the load-responsive regenerative brake limiter is configured to reduce a braking torque generated by the regenerative brake when a value calculated based on the load that acts along a direction in which the vehicle travels and the load that acts along a widthwise direction of the vehicle which are outputted from the load sensor reaches a preset value.

5. The electric vehicle as claimed in claim 1, wherein the motor unit, together with the wheel bearing unit, forms an in-wheel motor drive system that is partly or entirely disposed within the wheel, and wherein the in-wheel motor drive system includes the motor unit and the wheel bearing unit.

6. The electric vehicle as claimed in claim 5, wherein the in-wheel motor drive system includes a reducer unit configured to transmit to the wheel rotation with a speed that is reduced with respect to that of rotation of the motor unit.

7. The electric vehicle as claimed in claim 5, wherein the in-wheel motor drive system, together with an inverter unit, forms an in-wheel motor unit, the inverter unit including the motor control circuitry and a power circuitry configured to supply a flow of drive current to the motor unit under control of the motor control circuitry, and the motor control circuitry including the load-responsive regenerative brake limiter.

* * * * *